(12) United States Patent
Stein et al.

(10) Patent No.: US 6,469,862 B2
(45) Date of Patent: *Oct. 22, 2002

(54) METHOD AND APPARATUS FOR IMPROVED SERVO SIGNAL FILTERING IN READ CHANNELS

(75) Inventors: Anatoli B. Stein, Los Altos; Ufuk Karaaslan, Sunnyvale; Ilia M. Bokchtein, Santa Clara, all of CA (US)

(73) Assignee: Guzik Technical Enterprises, San Jose, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/260,272

(22) Filed: Mar. 2, 1999

(65) Prior Publication Data

US 2001/0055173 A1 Dec. 27, 2001

(51) Int. Cl.[7] ............................ G11B 5/596; G11B 5/09
(52) U.S. Cl. ...................................... 360/77.02; 360/46
(58) Field of Search .............................. 360/46, 77.02, 360/77.12

(56) References Cited

U.S. PATENT DOCUMENTS 4,573,089 A * 2/1986 Maeda et al. ................. 360/77
4,862,294 A * 8/1989 Mihara et al. ............. 360/35.1

\* cited by examiner

*Primary Examiner*—Regina Y. Neal
(74) *Attorney, Agent, or Firm*—McDermott, Will & Emery

(57) ABSTRACT

A read channel network of a magnetic data storage device receives analog signals representative of user data and servo data, wherein the servo data is usable to position a read/write magnetic head. The servo data is separately processed within the read channel network to improve the signal to noise ratio of the user data signal and, thereby, permit improved positioning accuracy of the read/write head within the magnetic data storage device. The servo signal applied to a multiplier along with an oscillating signal reference signal to produce a sideband signal, which is passed through a bandpass filter having a bandwidth about that of the sideband signal and having a center frequency substantially the same as that of the sideband signal. Additionally, the signal output by the bandpass filter is processed by an envelope detector, and then by an A/D converter and digital filter to produce a digital signal representative of the servo signal.

11 Claims, 6 Drawing Sheets

METHOD AND APPARATUS FOR IMPROVED SERVO SIGNAL FILTERING IN READ CHANNELS

BACKGROUND OF THE INVENTION

The present invention relates to magnetic memory devices, and more particularly to systems for detecting servo data between tracks in magnetic disks.

Magnetic systems, such as disk drives, are used to store large amounts of user data. In disk drives, the user data is written onto concentric tracks or disk-shaped magnetic media. Each track is defined by a circular path on the disk. Commonly, beyond the user data, additional positioning information, known as servo data, is written periodically between tracks. Both user data and servo data are magnetic markings written on the media. The servo data are used to guide the read/write heads, which are normally used to read and write user data, to a proper position. The frequency characteristics of user data and servo data are quite different. While the spectrum of user data occupies a fairly wide band, depending on the specific information written, the spectrum of the servo data is quite narrow, and typically somewhat lower than the highest frequencies that are used for user data. One of the reasons for the lower frequency is to provide good noise immunity, which is particularly important in reading servo data, in order to guarantee proper positioning of the read/write head and thereby reduce read-error rate. Better noise immunity is achieved by setting the frequency spectrum of the servo data to be in the region of the spectrum where there is no significant attenuation due to magnetic head and media effects.

It is important to optimize this noise immunity in order to increase head positioning error and reduce the read-error rate of the device. Therefore, disk drive read channel manufacturers try to optimize noise characteristics of their devices differently for reading user data as opposed to servo data. As an example, FIG. 1 shows a section 5 of a typical prior art read channel utilizing the so-called PRML (Partial-Response Maximum-Likelihood) data-detection method. The PRML method improves the data throughput and increases areal density, compared to earlier data-detection methods used in disk drive magnetic recording.

As shown in FIG. 1, an analog input signal 10, which is the amplified read output signal of a magnetic head, is passed through a programmable low pass filter (LPF) 20 to attenuate high frequency noise. After the LPF 20, the signal is digitized by analog to digital (A/D) converter (ADC) 30, where it is digitized to accommodate further processing in the digital domain. After the signal has been digitized, it is passed through digital finite impulse response (FIR) filter 40, which provides frequency response equalization to compensate for the head and media frequency response imperfections. The FIR 40 also provides additional low-pass filtering. It should be noted that sometimes FIR 40 is placed prior to ADC 30 to achieve the same equalization and filtering effect in the analog domain.

As the read channel is used to process both user data and servo data, and it is desirable to optimize its characteristics for both modes of operation, a binary servo gate signal 70 is used to change the filtering parameters of the LPF 20 and FIR 40 filters, and to selectively activate the servo demodulator 60. When the servo gate signal 70 is low, the read channel is operated in the user data mode, and when the servo gate signal 70 is high, the read channel is operated in the servo mode. In the user data mode, the output of the ADC 30/FIR 40 combination is processed by the activated data demodulator 50, which produces user NRZ data. In the servo mode, the FIR output is processed by the servo demodulator 60, which produces a servo control signal used by the positioning circuitry (not shown).

Disregarding the head and media response imperfections, FIGS. 2A–2C illustrate the frequency response of the read channel in the user data mode and the effect of the filters on the signal and noise spectra. The user data spectrum 80 and noise spectrum 90, shown in FIG. 2A, on the input to the read channel, is modified by the low-pass filter combination signal 100, shown in FIG. 2B, of the LPF 20 and FIR 40 to produce the spectra 110 and 120, shown in FIG. 2C, for user data and noise respectively. While the overall signal-to-noise ratio has been improved, the in-band noise has not been attenuated.

FIGS. 3A–3C illustrate the frequency response of the read channel of FIG. 1 in the servo mode, and the effect of the filters on the signal and noise spectra. The servo data spectrum 130 and noise spectrum 90 (which is essentially unchanged compared to the user data case), shown in FIG. 3A, received at the input of the read channel, are modified by the low-pass filter combination 140, shown in FIG. 3B, of the LPF 20 and FIR 40 to look like the spectra 150 and 160 for servo data and noise respectively, shown in FIG. 3C. As the highest components of the spectrum of servo data 150 are substantially lower in frequency than the highest components of the user data spectrum 80, the filter response 140 is modified by the servo gate signal 70, compared to the filter response 100 of FIG. 2B, to have a lower cutoff frequency and, thus, noise is reduced more than in the user data case of FIG. 2C, as reflected in noise spectrum 160. However, because the low-pass topology is still used, there are substantial noise components at both high and (especially) low ends of the spectrum which substantially degrade the theoretically possible signal to noise ratio for the servo data.

It is therefore desirable to improve the signal-to-noise ratio of the processed servo signal. It is further desirable to do so for a range of servo signal frequencies which are optimum for a particular head and media combination used in a magnetic recording device.

SUMMARY OF THE INVENTION

This invention provides the improvement of signal-to-noise ratio of servo signal detection in read channels. To optimize the signal to noise ratio, the input servo signal is multiplied with a reference signal and then band-pass filtered. In order to address the optimal selection of servo data spectrum based on media characteristics, the placement of the band-pass filter center frequency is made variable. This is achieved by introducing a heterodyne in the path of the analog servo signal, thereby shifting the center of the spectrum and subsequently passing the servo signal through a fixed band-pass filter.

In the preferred form, an analog user data input signal is passed to a low pass filter and then to an A/D converter, to create a digital representation of the user data signal. The digital user signal is then processed by a finite impulse response filter, which provides frequency response equalization to compensate for head and media frequency response imperfections and then it is processed by a data demodulator. The servo data input signal is passed to an oscillator and then to a band pass filter. The servo signal is then passed to an envelope detector and then to an A/D converter, where it is represented as a digital servo signal. From the servo demodulator, the digital signal is then passed to a servo control system.

BRIEF DESCRIPTION OF THE DRAWINGS

The foregoing and other objects of this invention, the various features thereof, as well as the invention itself, may be more fully understood from the following description, when read together with the accompanying drawings, as described below.

DETAILED DESCRIPTION OF THE PREFERRED EMBODIMENTS

Figure 1:
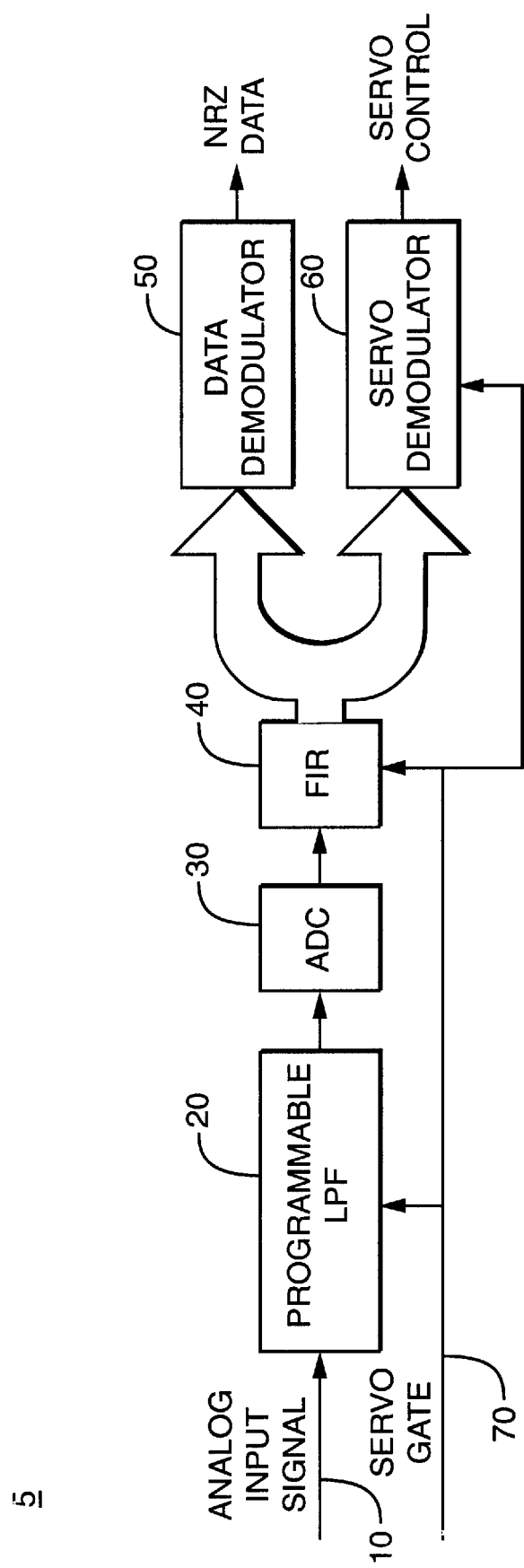
FIG. 1 is a block diagram of a typical PRML type read channel circuit of the prior art.
Figure 2A:
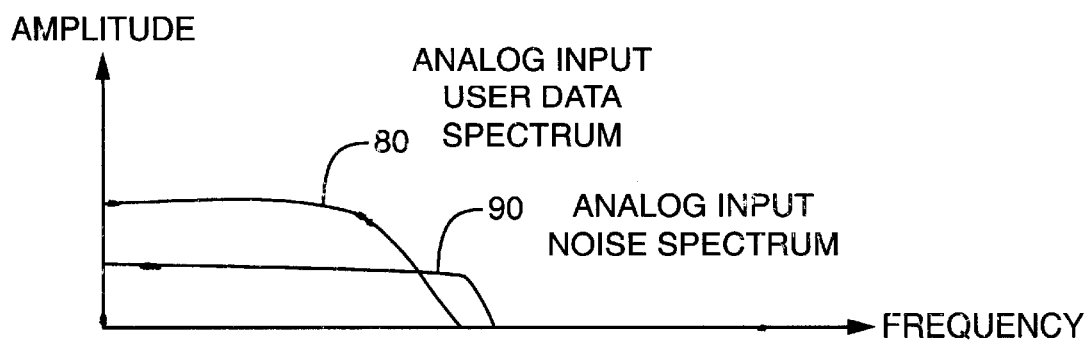
FIGS. 2A–2C are graphical representations of the frequency response of the read channel of FIG. 1 in the user data mode.
Figure 2B:
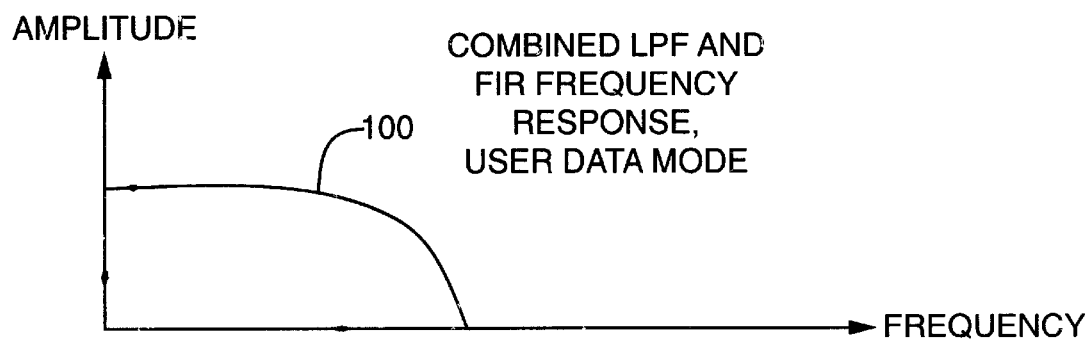
Figure 2C:
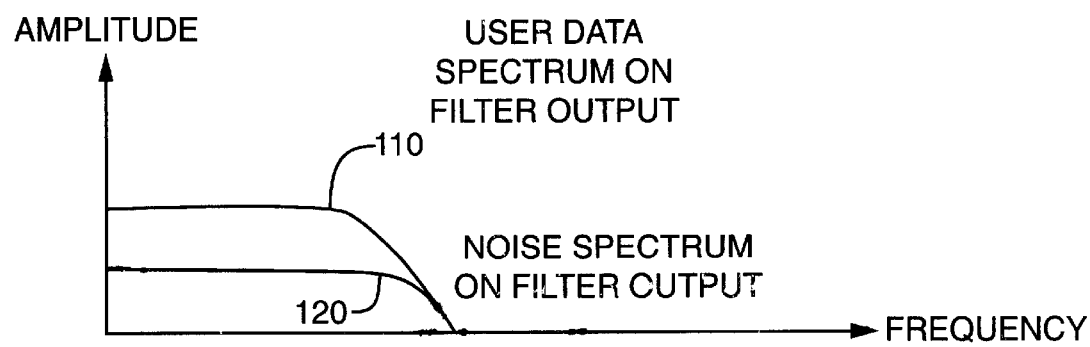
Figure 4:
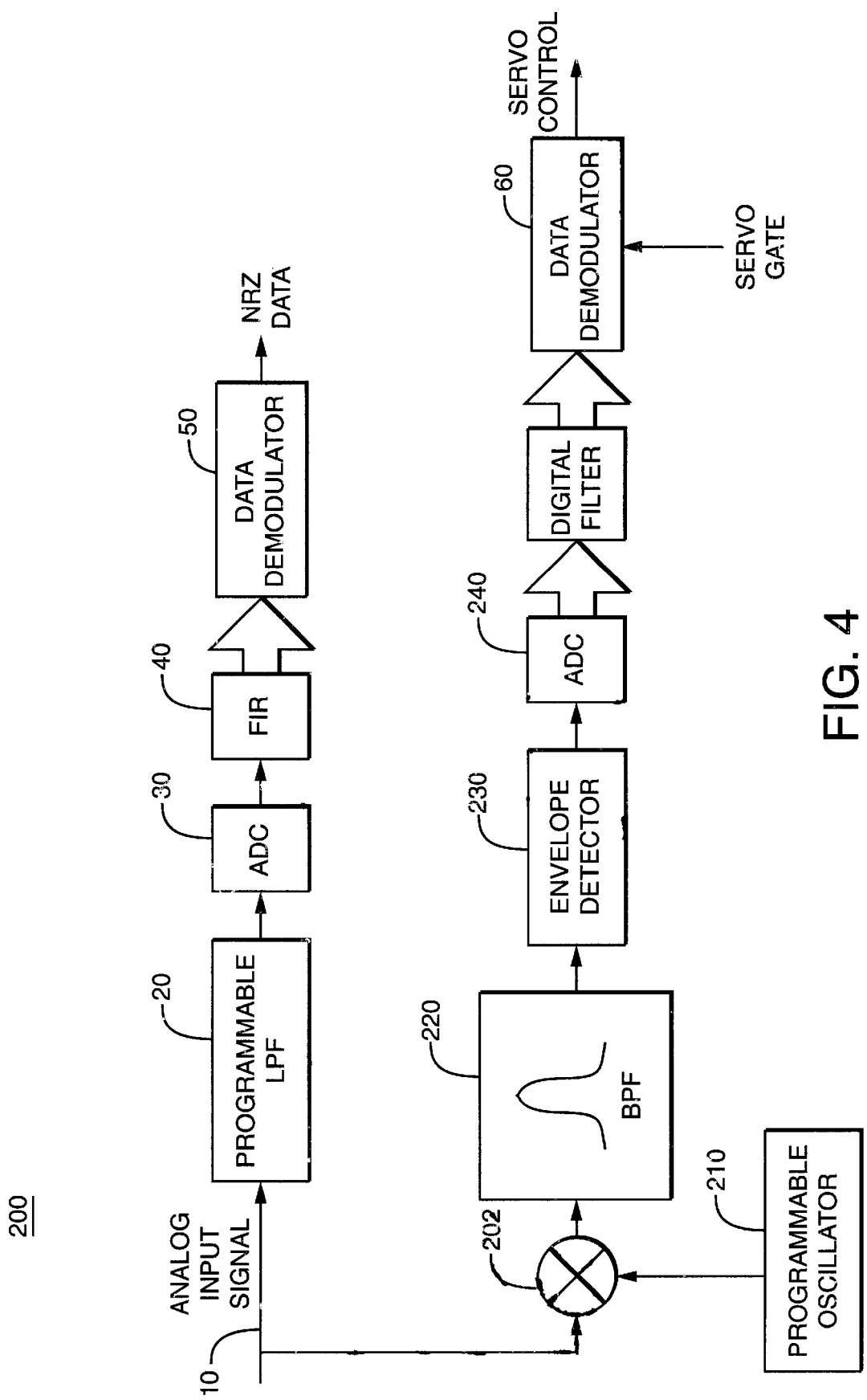
FIG. 4 is a block diagram of the preferred embodiment of a portion of a read channel in accordance with the present invention.

FIG. 4 illustrates the preferred embodiment of a substantive portion of read channel 200 for a magnetic system of the present invention. The user data and servo paths are separate to accommodate more effective processing of a servo signal received at the input of the read channel. The user data signal is processed in a manner similar the that of the prior art, as shown in FIG. 1A, wherein the user data signal is received at the input of the read channel and passed to a low pass filter (LPF) 20 and then to an A/D converter (ADC) 30, where it is digitized. The digitized user signal is then passed to a finite impulse response (FIR) filter 40 for frequency equalization and then to a data demodulator 50. The processed user data signal is then output from the read channel for use by other system entities.

In order to process the servo data, analog input signal 10 is applied to a multiplier 202, where it is multiplied by the output of a programmable oscillator 210 in order to shift its center frequency to the center frequency of band-pass filter (BPF) 220. After being filtered by the band-pass filter 220, the servo signal is passed through envelope detector 230 in order to detect the amplitude of the servo signal. The envelope of the servo signal provides sufficient information for purposes of positioning a read/write head, as only the average amplitude of the servo signal is needed for positioning information. The servo signal is then digitized by ADC 240 and processed by the servo demodulator for use by a servo control system (not shown). The servo demodulator is selectively activated by a servo gate signal to define the interval during which demodulation occurs, to produce the servo control signal.

Figure 5A:
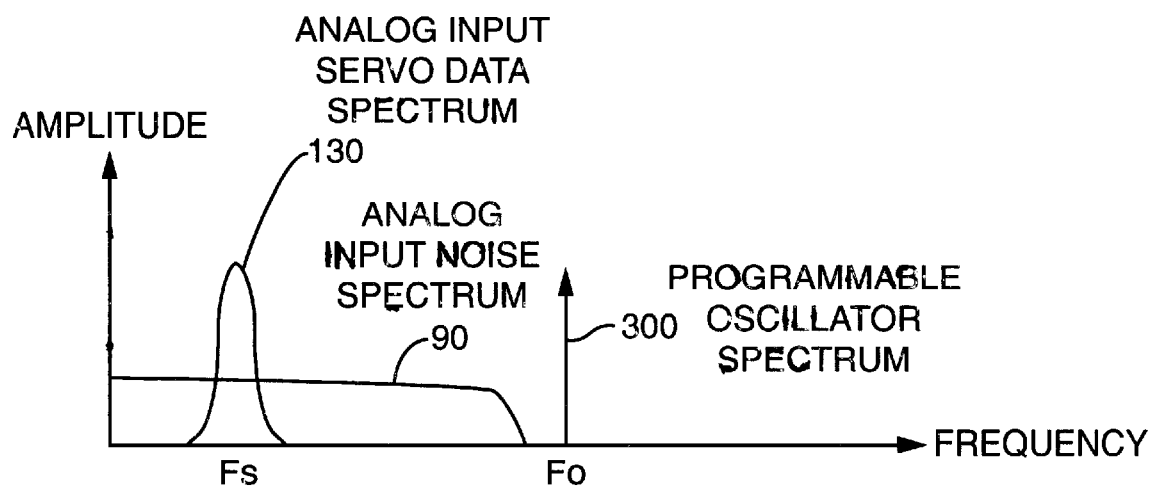
FIGS. 5A–5B are graphical representations of the frequency response of the read channel the read channel of FIG. 4.
Figure 5B:
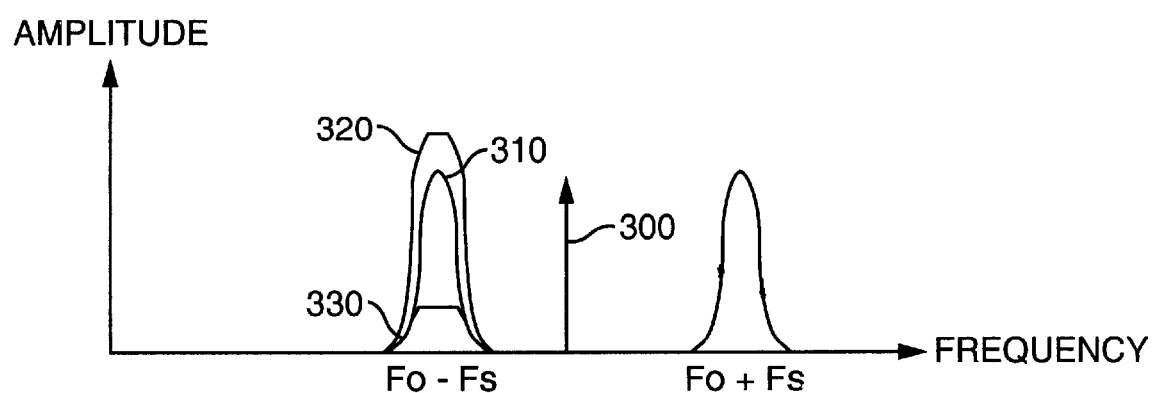

FIGS. 5A–5B illustrate the filtering effects of the read channel 200 on the servo and noise spectra. After the servo spectrum 130 with the center frequency Fs, where Fo is greater than Fs, is multiplied with an oscillatory signal from the programmable oscillator 300, having frequency Fo, two spectra (i.e., sidebands) are generated at frequencies center frequencies Fo+Fs and Fo−Fs. The frequency of the programmable oscillator 210 is, in this case, selected so that Fo−Fs is substantially equal to the center frequency of the BPF 220 which has the spectrum 320. Alternatively, the BPF 220 could be designed to have a center frequency Fo+Fs, and the upper sideband could be used. After the BPF 220 (which has a bandwidth at least as wide as the spectrum 130), the servo spectrum looks like signal 310, and so is essentially unchanged. However, the noise spectrum 330 is severely attenuated compared to the original noise spectrum 90, resulting in an improved signal-to-noise ratio.

Figure 3A:
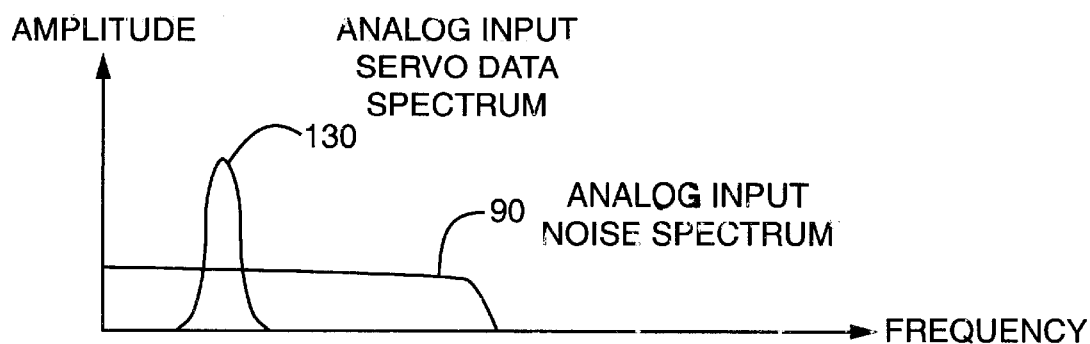
FIGS. 3A–3C are graphical representations of the frequency response of the read channel of FIG. 1 in the servo data mode.
Figure 3B:
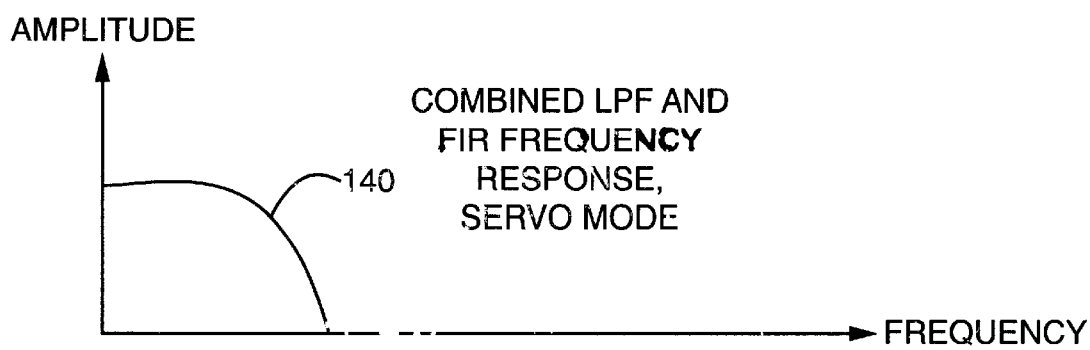
Figure 3C:
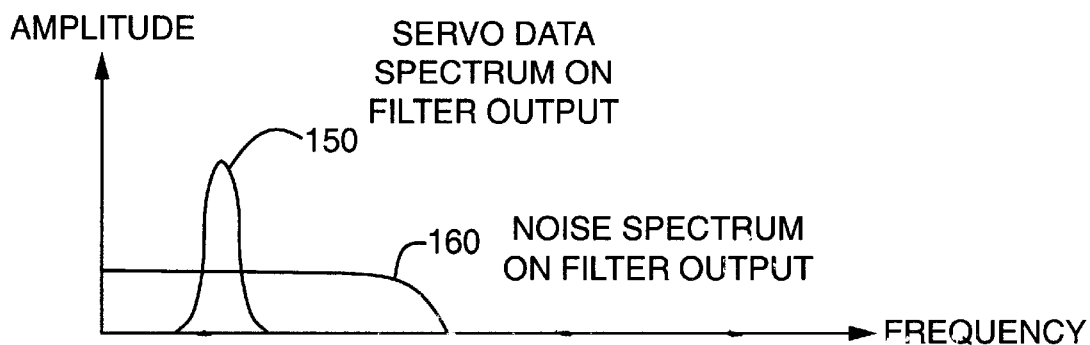
Figure 6A:
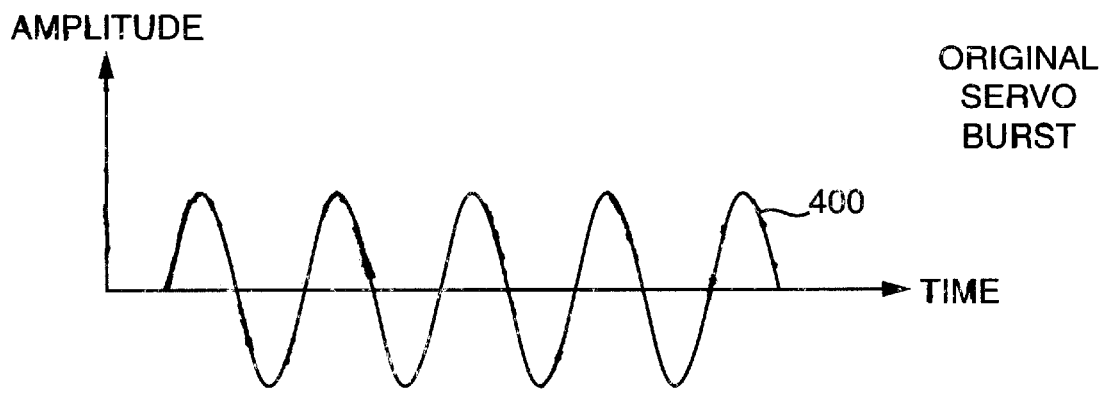
FIGS. 6A–6C are graphical representations of a servo burst as it propagates through the read channel the read channel of FIG. 4.
Figure 6B:
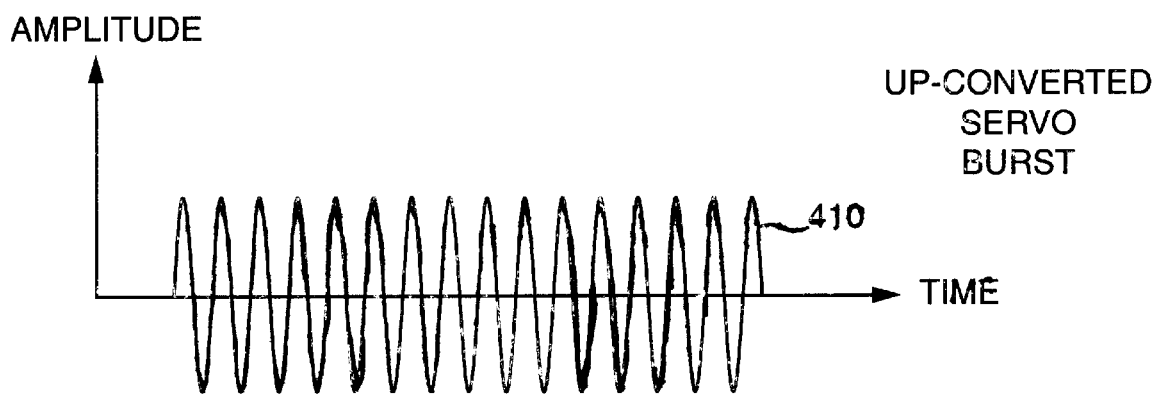
Figure 6C:
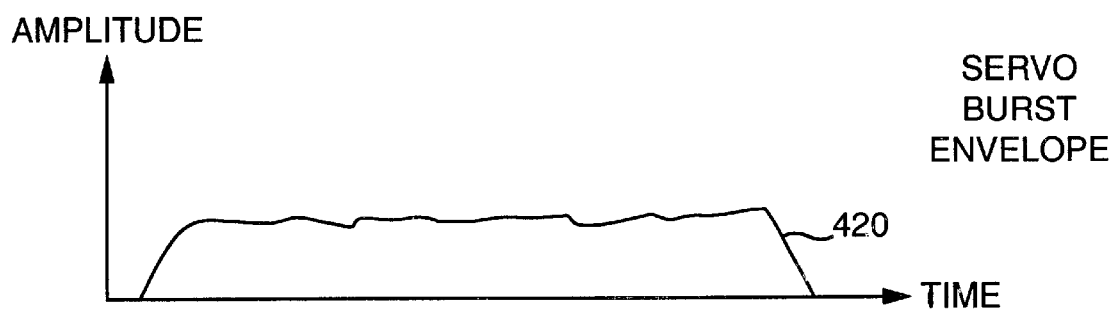

FIGS. 6A–6C show an example of a servo burst 400, shown in FIG. 6a, as it is processed. After being multiplied with the programmable oscillator output 300 and filtered by BPF 220, the servo burst takes the form of the up-converted burst 410 of FIG. 6B. The envelope detector 230 obtains the envelope 420 of the up-converted servo burst signal 410, as shown in FIG. 6C. Those skilled in the art will appreciate that the noise content of envelope 420 is significantly lower than it would be using the read channel of FIG. 1, because of the relatively narrow filtering provided (see FIG. 5B) by the BPF 220 for the servo signal as compared to the bandwidth of the filter 140 (see FIG. 3B) from LPF 20 and ADC 30. In addition, utilizing the programmable oscillator 210 enables the servo read channel to operate with a wide range of servo frequencies, as needed for optimal servo signal amplitude, thereby further improving the robustness of the servo circuitry. It should be noted that some noise, related to the finite bandwidth of the BPF 220 remains, as shown in an exaggerated fashion in the envelope 420. This noise can be substantially reduced by further processing after digitization by the ADC 240.

In summary, the addition of the multiplier, the programmable oscillator, and the band pass filter has substantially improved the signal-to-noise ratio of the processed servo signal. It has also enabled precise selection of the optimal servo signal frequency.

The invention may be embodied in other specific forms without departing from the spirit or central characteristics thereof. The present embodiments are therefore to be considered in all respects as illustrative and not restrictive, the scope of the invention being indicated by appending claims rather than by the foregoing description, and all changes that come within the meaning and range of equivalency of the claims are therefore intended to be embraced therein.

What is claimed is:

1. A system for processing servo data in an analog read channel signal of a magnetic data storage device, said analog read channel signal including a relatively broad band noise spectrum and a relatively narrow band servo signal centered at a frequency Fs having a bandwidth BWs, comprising:

A. an oscillator for generating an oscillator signal at a frequency Fo, where Fo is higher than Fs;

B. a multiplier having a first input coupled to said analog read channel signal and a second input coupled to said oscillator signal, and an output providing a multiplier signal representative of the product of said analog read channel signal and said oscillator signal;

C. a bandpass filter coupled to said multiplier output and having a center frequency at a frequency Fo−Fs or Fo+Fs and having a bandwidth at least equal to the bandwidth BWs, said filter being responsive to said multiplier signal to generate a filter signal;

D. an envelope detector responsive to said filter signal to generate an envelope signal representative of the envelope of said bandpass filter output signal;

E. an A/D converter having an input in electrical connection with an output of said envelope detector; and F. a digital filter having an input in electrical connection with an output of said A/D converter.

2. The servo signal processing system of claim 1 wherein said oscillator is a programmable oscillator.

3. The servo signal processing system of claim 1 wherein the bandwidth of said band pass filter is substantially the same as the bandwidth BWs.

4. A read channel network within a magnetic storage device which receives a servo signal having a bandwidth BWs and a center frequency Fs, and a user data signal, the read channel network comprising:

A. a servo signal processor, comprising:
   i. a multiplier having at least a first and a second input and at least one output, wherein a servo signal is received at said first input;
   ii. an oscillator in electrical connection with said multiplier second input and that provided on said second input a reference signal at a selectively chosen frequency FO, where Fo is greater than Fs, wherein said multiplier generates at least one sideband signal representative of said servo signal having a center frequency Fo−Fs or Fo+Fs, in response to receipt of said servo signal and said reference signal;
   iii. a band pass filter having an input in electrical connection with said multiplier output, wherein the bandwidth of said band pass filter is substantially centered at the center frequency of the sideband signal and is at least marginally wider than the bandwidth of said sideband signal to produce a filter signal; and
   iv. an envelope detector in electrical connection with an output of said bandpass filter and which detects the envelope of said filtered signal;
   v. an A/D converter having an input in electrical connection with an output of said envelope detector; and
   vi. a digital filter having an input in electrical connection with an output of said A/D converter;

B. a user data processor, comprising:
   i. a lowpass filter which receives the user data signal at an input and produces a filtered user data signal therefrom;
   ii. an A/D converter in electrical connection with the lowpass filter and which receives the filtered user data signal at an input and produces a digital user data signal in response;
   iii. a digital filter which receives said digital user data signal and produces a filtered digital representation of said digital user data signal.

5. The read channel network of claim 4 wherein said oscillator is a programmable oscillator.

6. The read channel network of claim 4 wherein the bandwidth of said bandpass filter is substantially the same as the bandwidth BWs.

7. A method for processing a servo signal having bandwidth BWs and a center frequency Fs, in a read channel of a magnetic data storage device having a separate path within the read channel for processing user data and servo data, wherein the read channel includes a multiplier, an oscillator, a bandpass filter, an envelope detector, an A/D converter and a digital filter, the method comprising the steps of:

A. multiplying the servo signal with a reference signal generated by the oscillator generator at a frequency Fo, where Fo is greater than Fs, to produce at least one sideband signal representative of the servo signal, the sideband signal having a center frequency Fo−Fs or Fo+Fs;

B. filtering the sideband signal with the bandpass filter, wherein the band pass filter has a bandwidth at least marginally wider than the bandwidth BWs and is substantially centered about the center frequency of the sideband signal to produce a filtered signal; and C. detecting the envelope of the filtered signal from the bandpass filter;

D. sampling said envelope with the A/D converter to produce a digital envelope signal; and E. digitally filtering the digital envelope signal to reduce its noise content.

8. The method for processing a servo signal of claim 7 wherein the step A includes the step of:
   A1. generating the reference signal with an oscillator.

9. The method for processing a servo signal of claim 7 wherein the oscillator is a programmable oscillator and step A includes the step of:
   A1. generating the reference signal with a programmable oscillator.

10. The method for processing a servo signal of claim 7 wherein step A includes the step of:
   A1. generating a reference signal having a lower sideband signal with a center frequency Fo−Fs; and
   A2. multiplying said lower sideband signal with said servo signal to produce a sideband signal which is representative of the servo signal.

11. The method for processing a servo signal of claim 7 wherein step A includes the step of:
   A1. generating a reference signal having a upper sideband signal with a center frequency Fo+Fs; and
   A2. multiplying said upper sideband signal with said servo signal to produce a sideband signal which is representative of the servo signal.

* * * * *